United States Patent Office 3,504,904
Patented Apr. 7, 1970

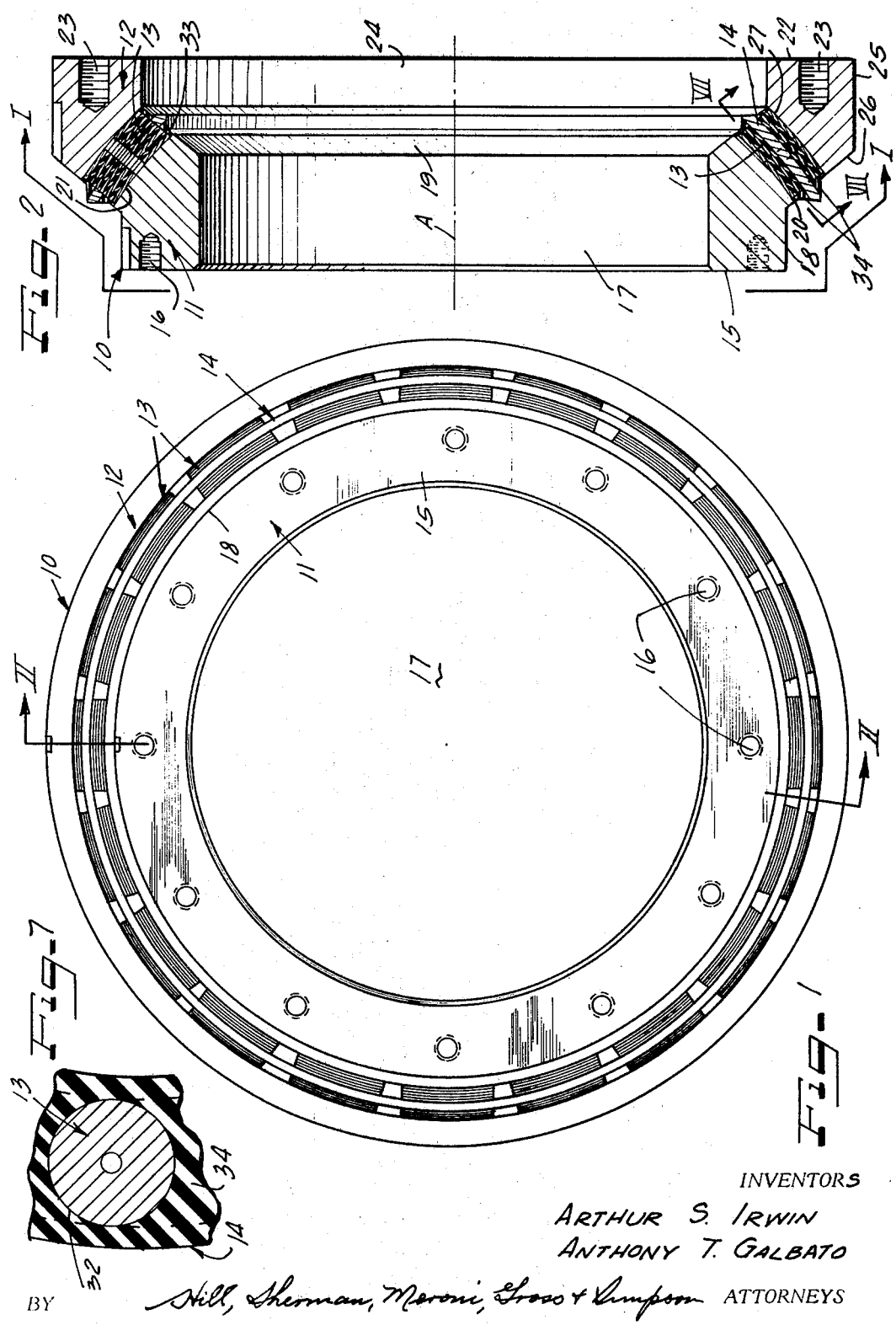

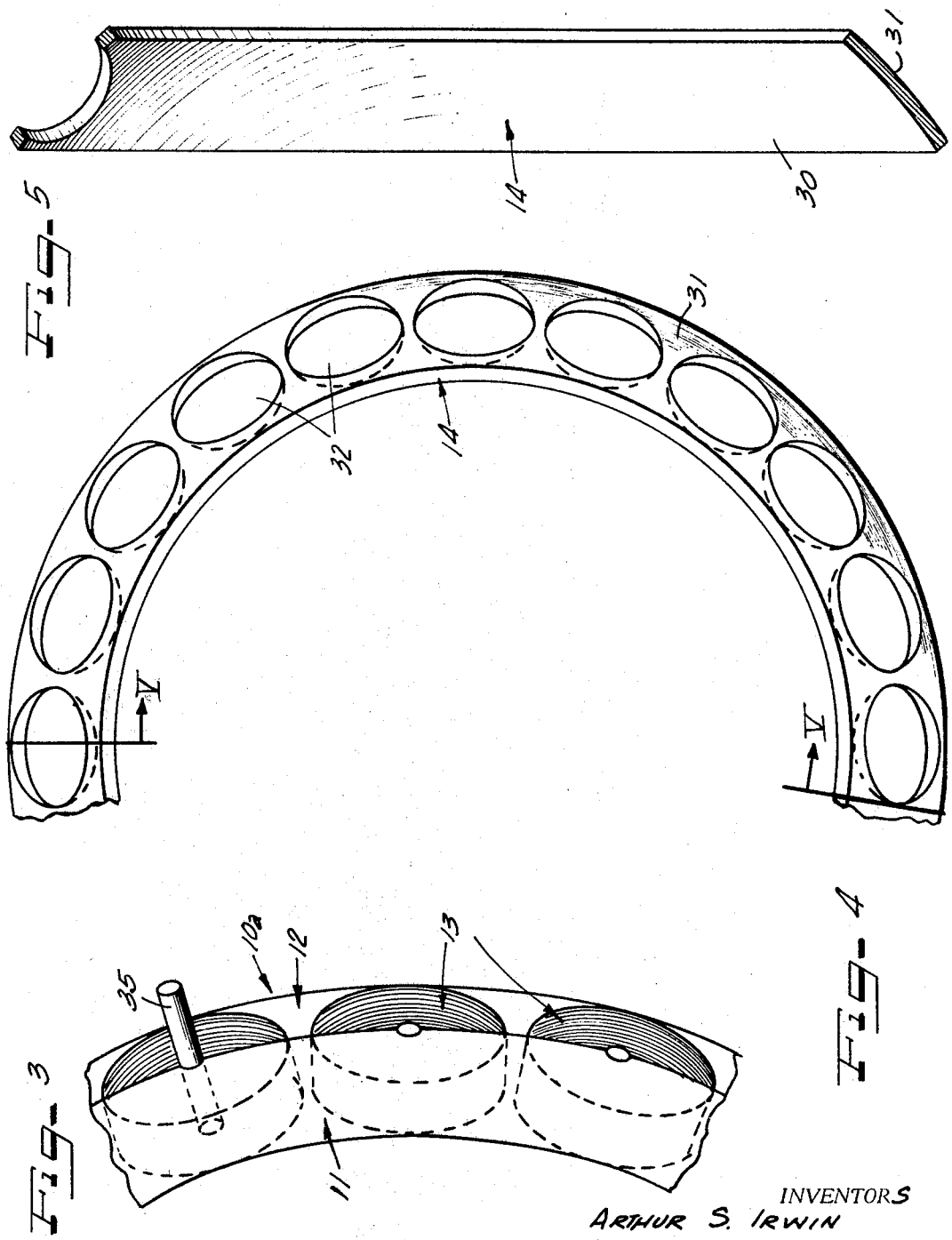

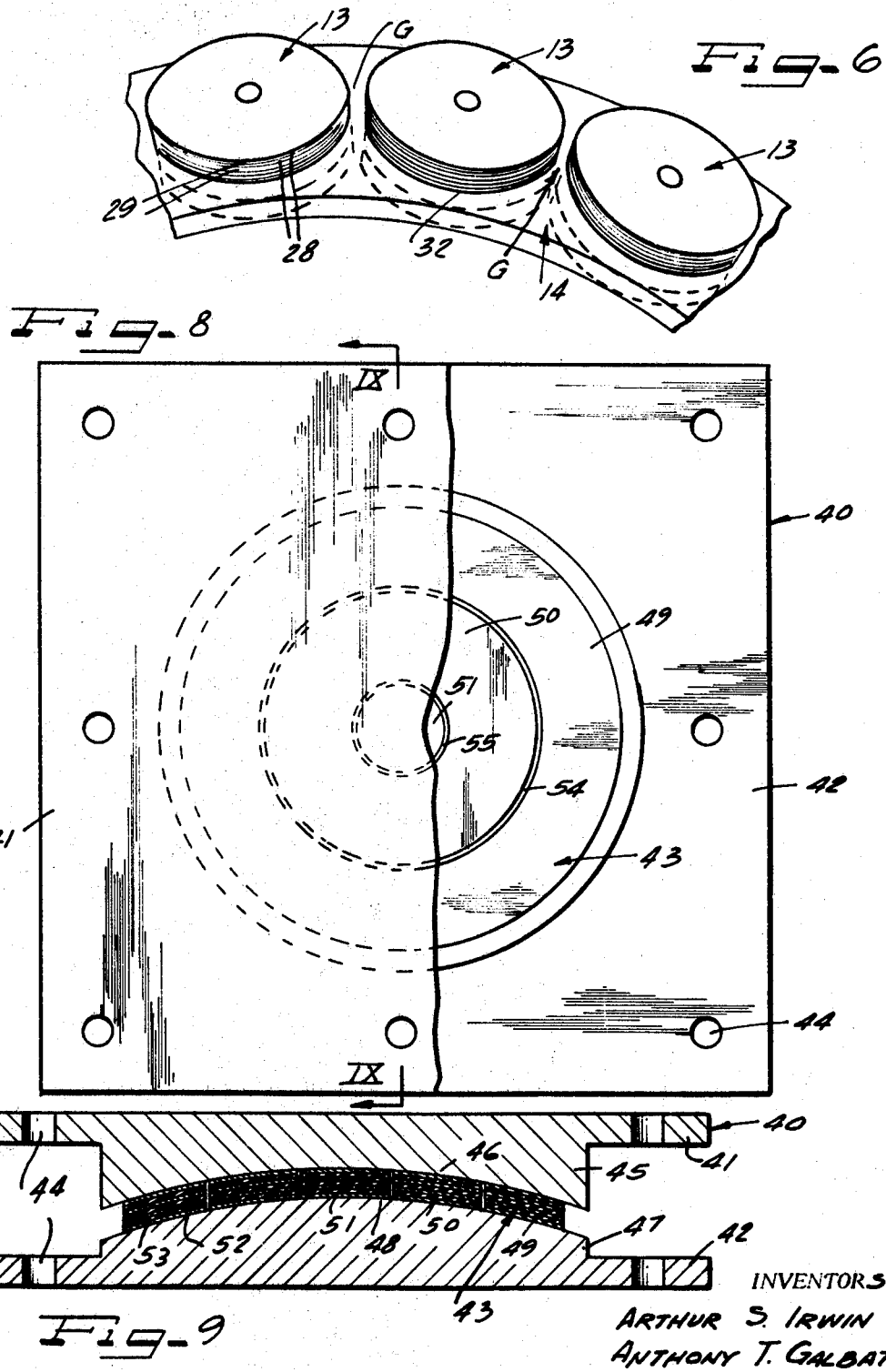

3,504,904
RETAINER RING BUTTON LAMINATED BEARING FLEXIBLE JOINT
Arthur S. Irwin and Anthony T. Galbato, Jamestown, N.Y., assignors to TRW Inc., Cleveland, Ohio, a corporation of Ohio
Filed Aug. 25, 1967, Ser. No. 663,434
Int. Cl. F16c 17/12, 23/04; F16f 7/00
U.S. Cl. 267—1                                6 Claims

ABSTRACT OF THE DISCLOSURE

A substantially incompressible laminated bearing swivel ring joint especially adapted for rocket nozzles and having stacks of bonded together alternating thin elastomer and nonelastomer layers arranged to reduce the chordal length of the bearing to accommodate conforming the stacks into the contours of the bearing rings.

BACKGROUND OF THE INVENTION

Field of the invention

The invention relates generally to the laminated bearing art and particularly to swivel joints embodying a plurality of stacks of thin laminae laminated bearings so positioned and arranged to readily conform with the shape of the relatively movable joint members while carrying the load therebetween and accommodating relative tilting of the members. The swivel joints of this invention have particular utility in rocket engines for mounting the exit nozzle while accommodating tilting of the nozzle to control the direction of thrust.

Description of the prior art

Thin laminae laminated bearings composed of alternate layers of metal and elastomer bonded to each other to form relatively non-compressible stacks even when subject to high axial thrust loads, but yielding to torsion or shear forces to accommodate relative shifting of the layers, are known in the prior art, as for example in the William L. Hinks patent, No. 2,900,182 entitled "Static Load Bearings," granted Aug. 18, 1959 from an application filed Apr. 27, 1955. These bearing stacks are most economically formed from flat layers of metal and elastomer, but the resulting flat bearings do not support appreciable side loads and tend to buckle under high axial loads, especially where the stacks have appreciable height. Since swivel joints must accommodate relative tilting movement of the joint parts and thereby require bearings or support means which will carry side loads, it has not heretofore been practical to use stacks of flat laminae bearings in swivel joints. The present invention now provides swivel joints utilizing stacks of laminae bearings which, in their free state, have flat laminae, but which are arranged to readily conform to the shape of the relatively movable members of the swivel joint into curved configurations which will carry side loads.

SUMMARY OF THE INVENTION

The invention will be specifically described as embodied in swivel joints for connecting the nozzle or exiting cone to the body of a rocket engine, and as such, includes a pair of mounting ring members, one of which is attached to the nozzle and the other of which is attached to the engine body. The ring members of the joint are connected by thin laminae laminated bearings and have opposed complementary concave and convex opposed arcuate surfaces struck from a radius centered on the desired tilting center for the joint. Interposed between these surfaces are stacks of thin laminae laminated bearings deformed into full conformity witht he arcuate surfaces. In one preferred embodiment, the stacks are in the form of circular buttons surrounded by a cage or retainer ring, and in another preferred embodiment, the stacks are in the form of concentric rings. The end laminae of the stacks are bonded to the arcuate surfaces of the joint rings. In the button embodiment, the stacks are spaced circumferentially between the bearing rings, while in the ring embodiment, the stacks are spaced radially.

The separation of the laminated bearings into a plurality of stacks between the rings of the joint breaks up the chordal length of the bearing and permits the laminae to conform with the arcuate shape of the bearing rings. If the laminated bearing consisted of a single stack of flat ring laminae the deflection of the laminae into conformity with the arcuate faces of the bearing rings would unduly stress the elastomer laminae to accommodate the severe bending of the metal laminae.

In order for a laminated bearing to accommodate relative movement of two opposed bearing faces, the elastomer in each layer must, by interparticle elastic displacement only, give or yield, thus accommodating a degree of relative movement between the adjacent non-elastomer layers. The total amount of give inherent in each elastomer layer is limited and any attempt to exceed that limit results in destruction of the bearing. Requiring a relatively large surface area flat bearing to conform to a nonplanar surface necessitates a degree of elastomer layer give. This reduces the amount of give remaining in each layer, thus unduly limiting the ability of the bearing stack to accommodate the relative movement of the bearing faces. This ability can be increased by increasing the number of layers, thereby increasing the bearing stack height which may be undesirable in a given embodiment, or by breaking up the chordal length of the bearing. Breaking up the chordal length of the bearing decreases the degree which each flat bearing segment must deform to mate with the nonplanar bearing faces thereby reducing the amount of give required of each elastomer layer for that purpose.

In the button embodiment, it is preferred, that the individual stacks have a circular shape and be bonded to the cage or retainer or at least separated from the cage by an interposed layer of elastomer.

In the concentric ring embodiment, the nested stacks preferably have gaps therebetween which may be filled with an elastomer.

In some instances, as where the arcuate surfaces of the bearing rings are struck from a very short radius and the curvature is severe, it might be preferable to provide laminated bearings which, in their free state have a contour at least approaching the contour of the bearing surfaces, thereby decreasing the required deformation of the bearing stacks to conform with the surfaces of the bearing rings. For reduction of cost and simplification of manufacture, the use of flat laminae in the bearing stacks is desired.

It is then an object of this invention to provide a laminated bearing assembly having a plurality of laminated bearing stacks with the laminate thereof in a plurality of planes and arranged to accommodate tilting movement about a fixed center.

Another object of this invention is to provide a swivel joint with bearing rings connected by a plurality of stacks of laminated bearings arranged to readily conform with the shape of the bearing rings to accommodate relative tilting thereof about a fixed axis.

A still further object of this invention is to provide a swivel joint for the nozzles of rocket engines having mounting rings with complementary arcuate surfaces struck from the same center and bonded the the end laminae of a plurality of stacks of laminated bearings each composed of bonded together alternate layers of elastomer and metal.

A specific object of this invention is to provide a swivel joint for rocket engines and the like wherein the joint parts are articulately connected by a ring of circumferentially spaced buttons each consisting of bonded together alternating layers of elastomer and metal and separated by a cage.

Another specific object of this invention is to provide a swivel joint for rocket engines having confronting bearing rings with arcuate surfaces connected by a plurality of nested rings of laminated bearing each consisting of bonded together alternate layers of metal and elastomer.

Other and further objects and features of this invention will be understood by those skilled in this art from the following detailed description of the annexed sheets of drawings showing preferred embodiments of the invention.

BRIEF DESCRIPTION OF THE DRAWINGS

FIGURE 1 is a plan view of one form of swivel joint according to this invention taken along the line I—I of FIGURE 2;

FIGURE 2 is a cross-sectional view of the swivel joint of FIGURE 1 taken along the line II—II of FIGURE 1;

FIGURE 3 is a fragmentary plan view of a swivel joint as shown in FIGURES 1 and 2 in which the retainer or cage is eliminated;

FIGURE 4 is a fragmentary plan view of the retainer or cage used in joint of FIGURES 1 and 2;

FIGURE 5 is a cross-sectional view taken along the line V—V of FIGURE 4 with the holes omitted to show the spherical shape of the retainer;

FIGURE 6 is a broken fragmentary plan view of the retainer and the laminated bearings therein;

FIGURE 7 is a fragmentary cross-sectional view taken along the line VII—VII of FIGURE 2, but showing another embodiment wherein the space between the bearings is filled with elastomer to provide a seal;

FIGURE 8 is a plan view, with parts broken away to show underlying parts, of a pad-type swivel bearing according to this invention; and FIGURE 9 is a cross-sectional view taken along the line IX—IX of FIGURE 8.

DESCRIPTION OF THE PREFERRED EMBODIMENTS

The swivel joint 10 of FIGURES 1 and 2 is composed of a first or male bearing ring 11, a second or female bearing ring 12, a plurality of laminated bearing buttons 13 between the rings 11 and 12 and a bearing retainer or cage 14 receiving the bearings 13. The ring 11 has a flat end face 15 with circumferentially spaced tapped holes 16 therein to receive an exit cone or nozzle (not shown) of a rocket engine. The ring 11 has a cylindrical bore or central aperture 17 therethrough and a cylindrical peripheral wall 18 therearound. The bore 17 has an outwardly beveled or tapered mouth 19 and the periphery 18 has an outwardly tapered or beveled shoulder 20. An arcuate convex end wall 21 extends between the beveled mouth 19 and the shoulder 20 and is struck from a radius centered on the center line A of the bore 17.

The second ring 12 has a flat end face 22 with circumferentially spaced tapped holes 23 therein for mounting the ring on the body of a rocket engine. A cylindrical bore or central aperture 24 extends through the ring 12 and a cylindrical periphery 25 of the ring is concentric with the bore 24 and extends from the end face 22 to an inwardly beveled end wall 26.

An arcuate concave end wall or face 27 extends between the beveled end 26 and the bore or aperture 24 and is struck from the same center line A as the wall or surface 21.

The rings 11 and 12 thus have complementary opposed arcuate surfaces 21 and 27 with the concave surface 27 surrounding and overlying the convex surface 21.

As shown in FIGURE 6, the laminated bearings 13, in their free state, are a stack of flat circular disks with central holes therethrough. Each stack is composed of alternating bonded together thin metal laminae 28 and elastomer laminae 29, as more fully described in the Hinks patent, No 2,900,182. The laminae 28, although preferably composed of metal may be any material, including nonmetallic material such as plastic, characterized by high compression resistance and high stretch resistance. The elastomer layers 29 can be composed of any rubbery material, but in rocket engine application, heat resistant silicone elastomers are preferred. The elastomer layers 29 yield to torsion or shear forces accommodating shifting of the layers 28 relative to each other, but the elastomer layers are sufficiently thin and uniform in thickness to be substantially incompressible under axial loads. Thus, the bearings 13 will maintain a fixed spaced relation between the bearing rings 11 and 12, even under high thrust conditions.

The bearings 13 are circumferentially spaced and separated by the rigid retainer ring or cage 14 which, as shown best in FIGURES 4 and 5, is arcuate shaped having a concave face 30 overlying the convex surface 21 of the ring 11 and an opposite convex face 31 underlying the concave face 27 of the ring 12. The faces 30 and 31 are struck from the same center line A as the faces 21 and 27.

The retainer or cage 14 has circular holes 32 therethrough in equally spaced relation and each hole 32 receives a bearing 13. In order to insure against binding of the bearings in the holes 32 of the retainer 14, each bearing is surrounded by an elastomer sleeve 33 which may be an integral rubber coating around the stack of laminae 28 and 29. This sleeve 33 prevents the metal laminae 28 from binding against the walls of the holes 32.

Since, as shown in FIGURE 6, open gaps G are formed on each side of the ring 14 between the adjacent bearings 13 which will provide leakage paths between the bearing rings 11 and 12, the space between these rings 11 and 12 and surounding the bearings 13 can be filled with an elastomeric seal 34, best shown in FIGURES 2 and 7.

Since the bearings 13 are in the form of relatively small diameter disks or buttons freely seated in the holes of the retainer or cage 14, they will readily deflect into conformity with the surfaces 21 and 27 of the bearing rings 11 and 12 when they are sandwiched in position between the rings, as shown in FIGURE 2. Thus, an axial load on the assembly of FIGURE 2 will uniformly confrom each bearing 13 into the arcuate shape of the concavo-convex annular gap between the rings 11 and 12. The end laminae of the bearings 13 are bonded respectively to the surfaces 21 and 27 whereupon each button bearing 13 which was initially formed in a flat plane assumes the spherical shape of the pocket between the bearing rings and upon being bonded to these rings will retain this shape.

It will be understood that while the bearing stacks 13 are preformed in a flat plane, all of the bonding of the laminae, plus the bonding of the stacks to the rings 11 and 12, plus the bonding of the protecting sleeves 33, plus the filling of the gaps G with the elastomer 34 can occur in a single curing operation, although it may be preferable to initially bond the laminae 28 and 29 of each bearing in a flat plane before assembling the stacks between the bearing rings.

In the modified swivel joint 10a of FIGURE 3, the retainer 14 is omitted and the bearings 13 are directly bonded to the rings 11 and 12. For properly aligning the bearings 13 between the rings 11 and 12 during the bonding operation, pins 35 may be projected through receiving holes in the rings 11 and 12 and through the central apertures of the bearings 13 during the molding operation.

In the pad bearing modification 40 of FIGURES 8 and 9, the bearing rings 11 and 12 take the form of top and bottom plates 41 and 42 and the button-type laminated bearings 13 take the form of nested rings and disks 43.

The plates 41 and 42, as illustrated, are of generally square configuration with spaced mounting holes 44 around the margins thereof. The top plate 41 has a depending circular pad 45 with an arcuate concave bottom face 46. The bottom plate 42 has a raised central circular pad 47 with a convex arcuate top surface 48. The radius of curvature of each surface 46 and 48 is struck from the same center so that the surfaces are complementary.

The bearing 43 between the surfaces 46 and 48 is composed of an outer ring 49, an inner ring 50 and a central disk or button 51. The rings 49 and 50 and the button 51 are each composed of thin metal laminae of alternate bonded together elastomer and bearing material layers 52 and 53 and are formed in the same manner as the bearings 13 from initially flat rings or disks of elastomer and metal.

An annular gap or space 54 is provided between the rings 49 and 50 and a similar gap or space 55 is provided between the ring 50 and disk or button 51. These spaces accommodate free flexing of the individual rings and buttons relative to each other and may be filled with rubber or other elastomer if desired.

When the bearing 43 is interposed between the surfaces 46 and 48 of the pads 45 and 47 and axial load is exerted on the plates 41 and 42, the initially flat rings and button will readily conform to the exact shape of the surfaces 46 and 48 and the end laminae of the bearings is then bonded to these surfaces thus retaining the arcuate shapes imposed on the bearing.

The pad bearing or swivel joint 40 of FIGURES 8 and 9 operates in the same manner as the swivel joints 10 and 10a of FIGURES 1 to 7 and accommodates relative tilting movement of the plates 41 and 42 about a fixed center.

From the above descriptions it will, therefore, be understood that this invention provides swivel joints or bearings having the relatively tiltable parts thereof connected by stacks of thin laminae elastomeric and nonelastomeric alternating layers which accommodate tilting about a fixed center while resisting axial movement even under high thrust loads. The laminated stacks may be formed in flat free state shapes and are arranged so as to be easily deflected into arcuate or spherical shapes for resisting side loads.

Although minor modifications might be suggested by those versed in the art, it should be understood that we wish to embody within the patent granted hereon, all such modifications as reasonably and properly come within the scope of out contribution to the art.

We claim:

1. A swivel bearing comprising rigid parts having spaced opposed complementary concave and convex surfaces, a plurality of thin laminae laminated bearing stacks between said surfaces and having the end laminae thereof bonded to the adjacent surface, each stack being composed of thin flexible laminae of material having high compression and stretch resistance alternating with and bonded to thin elastomer layers substantially incompressible under axial loads but yielding under torsion loads to accommodate shifting of the thin laminae, said thin laminae and elastomer layers in their free state being flatter than the concave and convex surfaces of said rigid parts and being deformed by said parts into conformity with said surfaces, each of said bearing stacks having a chordal length substantially shorter than the chordal lengths of said concave and convex surfaces and being such as to accommodate deflexion into conformity with said surfaces without appreciably stressing the elastomer layers of the stacks, and said stacks uniting said rigid parts for relative tilting.

2. A laminated bearing swivel joint comprising a pair of relatively tiltable members having complementary concave and convex spaced opposed arcuate faces struck from radii on the same center, a plurality of thin laminae laminated bearing stacks between and bonded to said opposed faces, each stack being composed of thin flexible laminae of bearing material alternating with and bonded to thin elastomer layers yielding under torsion loads to accommodate shifting of the thin laminae, said thin laminae and elastomer layers in their free state being flatter than the concave and convex faces of said members and bowed by said members into conformity with said faces, said thin flexible laminae having short chordal lengths substantially less than the minimum chordal lengths of said concave and convex faces and sufficient to accommodate deflexion into conformity with said faces without appreciably stressing the elastomer layers, and said stacks uniting said members for relative tilting about the same center from which the radii for the concave and convex spaces thereof were struck.

3. A swivel bearing comprising a pair of rings having spaced opposed complementary concave and convex surfaces providing a concavo-convex annular gap between the rings, a plurality of small diameter stacks of thin laminae laminated bearings in said gap in circumferentially spaced relation, each of said stacks being composed of thin flexible laminae of bearing material alternating with and bonded to thin elastomer layers yielding under torsion loads to accommodate shifting of the bearing material but being substantially incompressible under axial loads, the end laminae of each of said stacks being bonded to the adjacent surface of the rings, the laminae of said stacks in their free state being flatter than the concavo-convex surfaces defining the gap and deformed by said rings into conformity with said surfaces, and each of said stacks having a chordal length which is only a small section of the chordal length of said surfaces to accommodate deflexion into conformity with said surfaces without appreciably stressing the elastomer layers, and said stacks uniting said rings for relative tilting movement.

4. The bearing of claim 3 including a rigid retaining cage in said gap having pockets receiving said stacks.

5. A laminated bearing joint which comprises a pair of plates having spaced opposed complementary concave and convex surfaces, a plurality of concentric stacks of thin laminae laminated bearings between said surfaces and spaced radially from each other, each stack being composed of thin flexible laminae of bearing material alternating with and bonded to thin elastomer layers substantially incompressible under axial loads but yielding under torsion loads to accomodate shifting of the thin laminae of bearing material, said stacks in their free state having the laminae thereof flatter than the concave and convex surfaces of said pads and deformed by the pads into conformity with said surfaces, each of said stacks having the end laminae thereof bonded to the adjacent concave or convex surface, and said stacks uniting said pads for relative tilting movements.

6. The bearing of claim 5 wherein said concentric stacks include a central disc at the apex of said concave and convex surfaces and a plurality of spaced concentric rings surrounding said central disc.

References Cited

UNITED STATES PATENTS

| | | | |
|---|---|---|---|
| 2,900,182 | 8/1959 | Hinks | 308—2 XR |
| 2,995,907 | 4/1961 | Drain | 64—11 |
| 3,027,626 | 4/1962 | Murphy | 29—148.4 |
| 3,074,254 | 1/1963 | Jones | 64—11 |
| 3,081,135 | 3/1963 | Olson | 308—195 |
| 3,083,065 | 3/1963 | Hinks et al. | 267—57.1 XR |
| 3,377,110 | 4/1968 | Boggs | 308—2 XR |
| 3,390,899 | 7/1968 | Herbert et al. | 239—265.35 XR |
| 3,429,622 | 2/1969 | Lee et al. | 308—2 |

ARTHUR L. LA POINT, Primary Examiner

HOWARD BELTRAN, Assistant Examiner

U.S. Cl. X.R.

29—148.4; 60—271; 64—11; 170—160.51; 239—265.17, 265.35; 267—57.1; 285—51, 223, 238, 263, 404; 287—85, 87; 308—2, 26, 237